Aug. 18, 1970    H. RAPP ET AL    3,524,478
PIPE LINE CONSTRUCTION FOR PNEUMATIC AND HYDRAULIC
CONVEYANCE OF SOLID MATERIAL

Filed June 15, 1967    5 Sheets-Sheet 1

INVENTOR.
HERMANN RAPP
WALTER ALLENSPACH
BY
attorneys

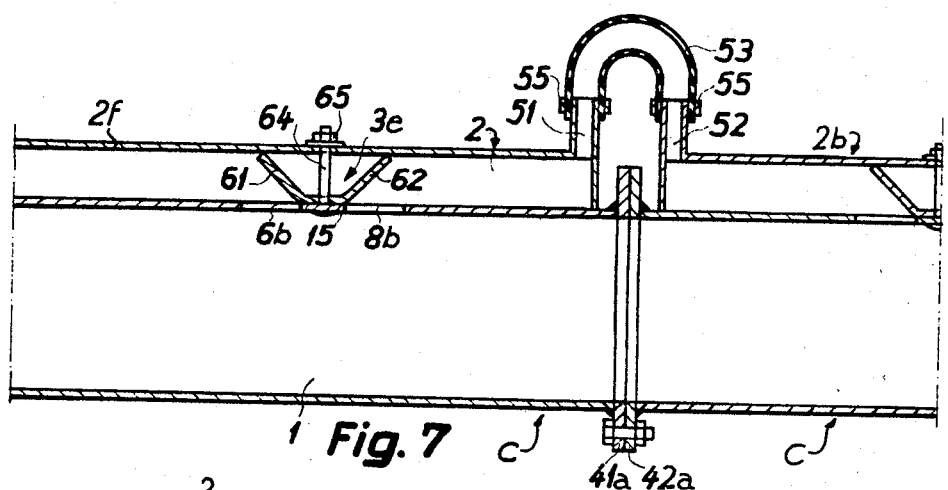
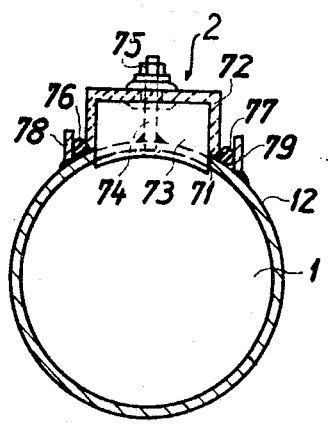
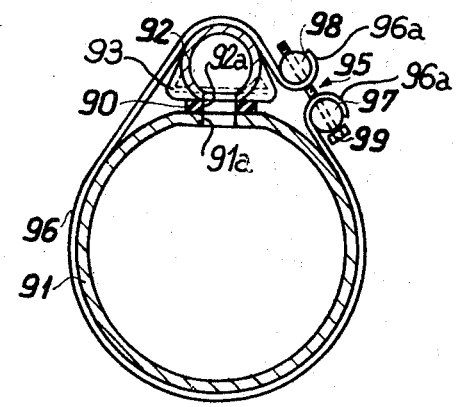
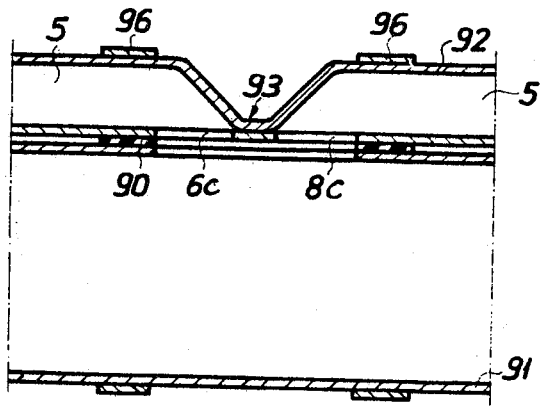
Fig. 7
Fig. 8
Fig. 9
Fig. 10

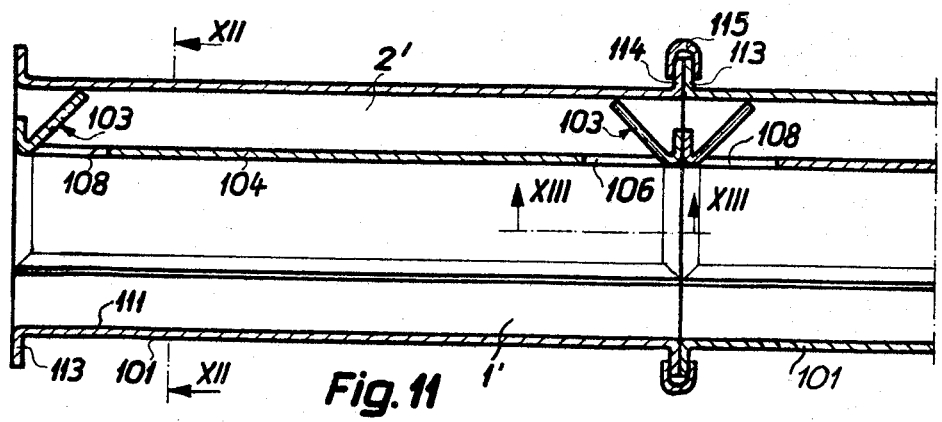
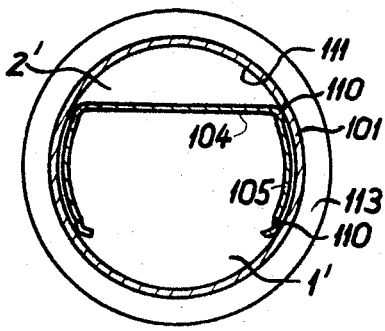
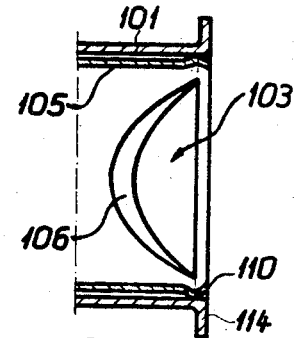
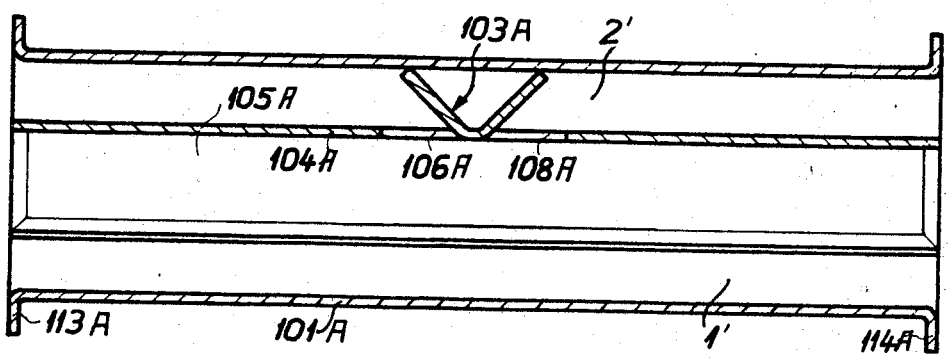

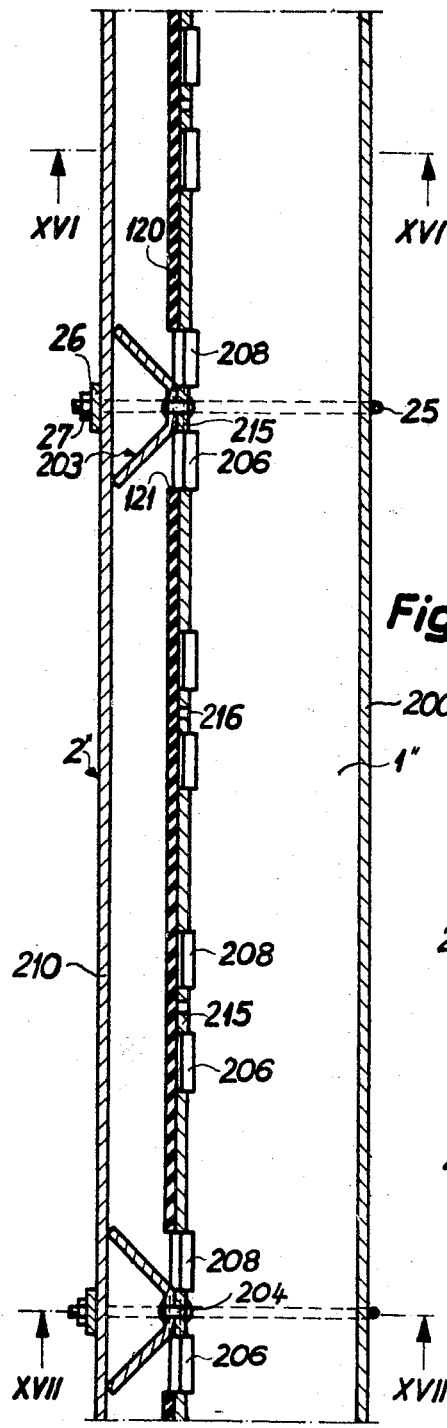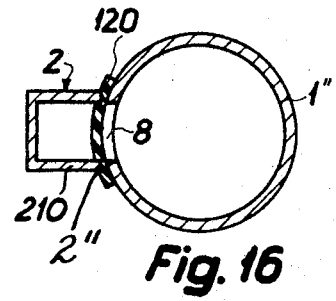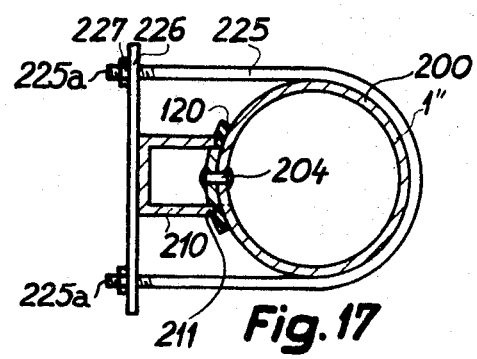

United States Patent Office 3,524,478
Patented Aug. 18, 1970

3,524,478
PIPE LINE CONSTRUCTION FOR PNEUMATIC AND HYDRAULIC CONVEYANCE OF SOLID MATERIAL
Hermann Rapp, Uzwil, and Walter Allenspach, Niederuzwil, Switzerland, assignors to Gebruder Buhler AG, Uzwil, Switzerland, a company of Switzerland
Filed June 15, 1967, Ser. No. 646,401
Claims priority, application Switzerland, June 16, 1966, 8,739/66
Int. Cl. F16l 9/18
U.S. Cl. 138—111                                    25 Claims

ABSTRACT OF THE DISCLOSURE

Pipe sections for use in constructing pipe lines for conveying solid particles of material either pneumatically or hydraulically and formed by a main conduit and a branch conduit disposed in parallel relationship and having openings therebetween. A web section is disposed within the branch conduit at the opening between the conduits for directing the flow of material. The conduits can be formed of two separate closed passageways, of a closed passageway forming the main conduit and an inverted trough-like shaped wall section secured to the closed tubular passageway member forming the branch section, and of a single tubular member having a divider plate separating it into the two conduits. Depending on the use to which the conduits are employed and the structure forming the two passageways, the members may be secured together either by an integral connection or by mechanical means.

SUMMARY OF THE INVENTION

The present invention is directed to a pipe line for conveying solid material and, more particularly, to a conveyor line divided into a main conduit and a branch conduit having openings between the two conduits spaced at intervals along their length. One of the characteristic features of the present arrangement is the disposition of exit and entrance openings between the main and branch conduits and the arrangement of a web section at the entrance for directing the flow of materials through the conveyor line.

In German Pat. No. 1,174,256, a method is disclosed for the automatic separation of a column of granular or powdered material which is conveyed through a pipe line by pneumatic or hydraulic means. The particles of materials being conveyed are relatively short and of almost equal length.

In the above patent, in addition to setting forth a method, it also contains apparatus for carrying out the method. However, the apparatus suggested contained certain disadvantages. The adaptation of the pipe line to meet various problems which arise in the transport of certain materials is possible, but only at considerable expense. With the suggested apparatus, which appears to be easily exchangeable, installations have been provided in a conveyor pipe line resulting in considerable blockage or jamming of the particles being transported, this occurs even with particles of a very finely powdered nature. Moreover, the problems that arise are especially noticeable if supporting webs are used which extend transversely of the conveyor pipes and across the flow of the material. In well known pneumatic methods of conveying material, this obstructing effect is particularly noticeable and is magnified as the deadweight of the matter per unit weight of the conveying medium increases. Accordingly, under such circumstances, the new method and apparatus of conveying material becomes substantially less economical. In the arrangement set forth in the present invention, these various disadvantages are overcome.

Accordingly, it is a primary object of the present invention to provide a main conduit and a branch conduit arranged in parallel relationship and having openings between the two forming entrance and exit apertures for the flow of the solid material therebetween.

Another object of the invention is to provide a web section within the branch member for directing the flow of materials between the main conduit and the branch conduit.

Still, another object of the invention is to afford means for mechanically or integrally securing the main conduit and the branch conduit together.

Moreover, another object of the present invention is to supply an arrangement of main and branch conduits which can easily be connected and disconnected for use in temporary pipe lines.

Yet, another object of the invention is to combine structures defining closed or partially opened passageways for forming the main and branch conduits with communicating openings between the two.

Another object of the present invention is to afford a construction wherein a singular tubular member with a dividing plate provides both the main conduit and the branch conduit. The divider plate is arranged so that it can be held in place either resiliently or by mechanical devices.

A futher object of the invention is to provide a pipe line construction which will afford easy installation.

Moreover, another object of the invention is to provide fluid impermeable materials between the main and branch conduits to seal against any loss of conveying fluid.

A still further object of the present invention is to supply a simple and economical pipe line construction which can be easily assembled and, in addition, overcomes the various disadvantages known in the previous pipe line arrangements.

Therefore, the present invention is concerned with a pipe section for a pipe line utilizing either hydraulic or pneumatic means for conveying solid particles of material. The pipe section comprises a main conduit and a branch conduit arranged in substantially parallel relationship. Openings are formed between the two conduits with a web member within the branch conduit at the opening between the two for directing the flow of material therebetween. The conduits may be formed of a single divided tubular member, of separate closed passageways, or of a one closed passageway in combination with a wall section secured to the member constituting the closed passageway.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 7 is a longitudinal sectional view showing an alternate arrangement of the pipe section construction set forth in FIG. 6;

FIG. 8 is a transverse sectional view setting forth an alternate arrangement of the pipe sections previously illustrated;

FIG. 9 is a transverse sectional view showing another embodiment of the present invention;

FIG. 10 is a longitudinal sectional view of the arrangement displayed in FIG. 9;

FIG. 11 is a longitudinal sectional view of still another embodiment of the present invention;

FIG. 12 is a transverse sectional view taken along line XII–XII of FIG. 11;

FIG. 13 is a partial longitudinal view taken long line XIII–XIII in FIG. 11;

FIG. 14 is a longitudinal sectional view of another arrangement of the general pipe section construction shown in FIG. 11;

FIG. 15 is a longitudinal sectional view of another embodiment of the present invention;

FIG. 16 is a transverse sectional view taken along line XVI–XVI in FIG. 16;

FIG. 17 is a transverse sectional view taken along the line XVII–XVII in FIG. 15.

DETAILED DESCRIPTION

Figure 1:
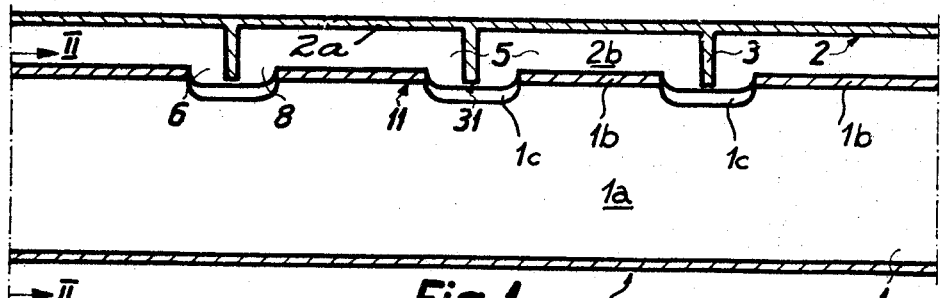
FIG. 1 is a longitudinal sectional view of one embodiment of a pipe section disclosing the present invention.

In FIG. 1, a pipe section A is shown which forms a part of a pipe line for conveying short homogeneous particles of material either by pneumatic or hydraulic means. The pipe section A comprises a main conduit 1 and a branch conduit 2 disposed in parallel relationship. The main conduit 1 is formed of a longitudinally extending tubular section providing a closed passageway 1a. Located on the top surface of the main conduit 1 is the branch conduit 2 formed by a wall member 2a having a multi-sided open transverse section. A pair of oppositely disposed sides 22 on the wall member 2a extend longitudinally along and are integrally attached to the outside surface of the main conduit. In combination with the outer surface of the main conduit, the wall member 2a forms a passageway 2b extending in parallel relationship with the passageway 1a of the main conduit.

At longitudinally spaced locations along the portion 1b of the main conduit, common to the branch conduit, there are a number of openings 1c which extend through it communicating between the passageway 1a in the main conduit and the passageway 2b in the branch conduit. Transverse web sections 3 secured to the wall member 2a extend across the passageway 2b at substantially the longitudinal midpoint of the openings 1c and divide the passageway 2b into a plurality of sub-passageways 5. In addition, the web section 3, which extends downward from the wall section 2a substantially to the crown of the main conduit 1, divides the openings 1c into an exit aperture 6 and an inlet aperture 8 for the sub-passageways 5. In FIG. 1, it will be noted that the lower edge 31 of each web section 3 is in longitudinal alignment with the inner surface of the main conduit 1.

Figure 2:
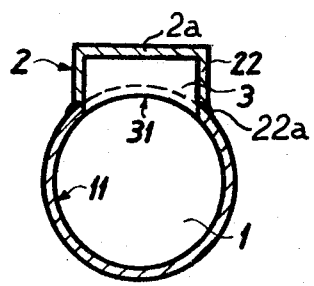
FIG. 2 is a transverse section of the arrangement shown in FIG. 1, taken along the line II–II thereof.

In FIG. 2, a transverse section of the pipe section A in FIG. 1, the arrangement and configuration of the wall section 2a forming the branch conduit 2 is illustrated. The wall section 2a has an inverted right-angled U- or trough-like-shaped configuration with a pair of depending sides 22 secured along their longitudinally extending edges 22a to the wall of the main conduit. As indicated previously, the web section 3 extends completely across the passageway 2b in the branch conduit and is secured to the wall section 2a about three of its edges with the fourth edge 31 aligned with the inner surface of the passageway within the main conduit 1.

Figure 3:
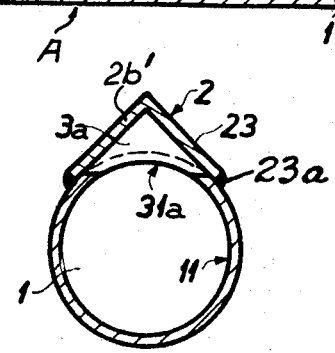
FIG. 3 is a transverse sectional view similar to FIG. 2 showing another embodiment of a portion of the pipe section.
Figure 4:
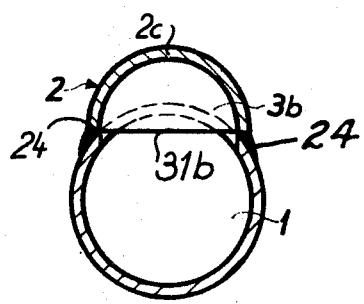
FIG. 4 is a transverse section illustrating another arrangement of the portion of the pipe section in FIGS. 2 and 3.

Alternate arrangements of the branch conduit 2 are shown in FIGS. 3 and 4. In FIG. 3, the branch conduit 2 is formed of a longitudinally extending right angle wall member 2b' with the apex of the angle spaced from the main conduit 1. Along the edges 23a of its outstanding legs 23 the wall member 2b' is integrally secured to the outer surface of the tubular section forming the main conduit. Attached to the wall member 2b' is a web section 3a having a triangular shape due to the configuration of the wall member 2b'. As with the web section 3 shown in FIG. 2, the edge 31a of the web is aligned with the inner surface of the main conduit 1.

In FIG. 4, the wall member 2c forming the branch conduit 2 is semi-circular in transverse section and extends longitudinally along the upper surface of the main conduit 1. The wall member 2c has a pair of longitudinally extending edges 24 integrally attached to the outside surface of the main conduit. Within the branch conduit formed by the wall member 2c, web section 3b extends transversely across the passageway similar to web sections 3, 3a in FIGS. 2 and 3, however, the lower edge 31b of the web extends below the crown surface of the passageway through the main conduit. The web sections 3, 3a, 3b shown in FIGS. 2–4 are attached to the respective wall sections of the branch conduit. Though it is preferable to have the edges 31, 31a of the web plates as shown in FIGS. 2 and 3 in longitudinal alignment with the interior crown surface of the main conduit 1, this is not an absolute requirement as it is indicated by the arrangement shown in FIG. 4.

Figure 5:
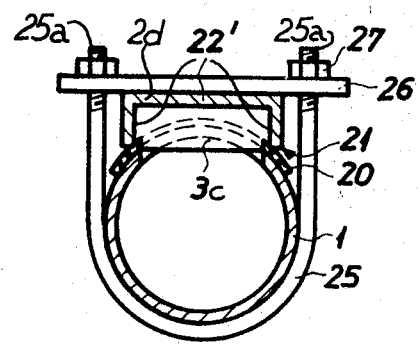
FIG. 5 is a transverse sectional view, generally similar to that shown in FIGS. 2 to 4, with the addition of mechanical means for securing the pipe section components together.

In the pipe section arrangement described thus far, the wall members 2a, 2b', 2c are integrally attached to the main conduit. However, for reasons of maintenance, control and cleaning, the wall member may be mechanically secured to the main conduit as shown in FIG. 5. In this embodiment, the wall section 2d in combination with the top surface of the main conduit forms the branch conduit and is generally similar to that shown in FIG. 2. The wall section 2d has a pair of depending sides 22' with longitudinally extending edges 21 closely spaced from the outer surface of the main conduit 1. Positioned between the outer surface of the main conduit and the edges 21 are strips of sealing material 20. A U-shaped bolt 25, having threaded ends 25a directed upwardly, extends about the main conduit 1. Supported on the top surface of the wall section 2d is a plate member 26 having a pair of openings which fit over the threaded ends 25a of the bolt 25. A nut 27 is secured on each of the threaded ends and forces the plate 26 against the wall member 2d and, in turn, seals the edges 21 in gas-tight engagement against the sealing material 20.

In FIGS. 2–5, four different arrangements of the wall member which combine with the main conduit to form the branch conduit are shown, these wall members are specifically arranged to provide a simple and easy assembly of the pipe line by such known joining methods as welding, soldering and clamping.

Figure 6:
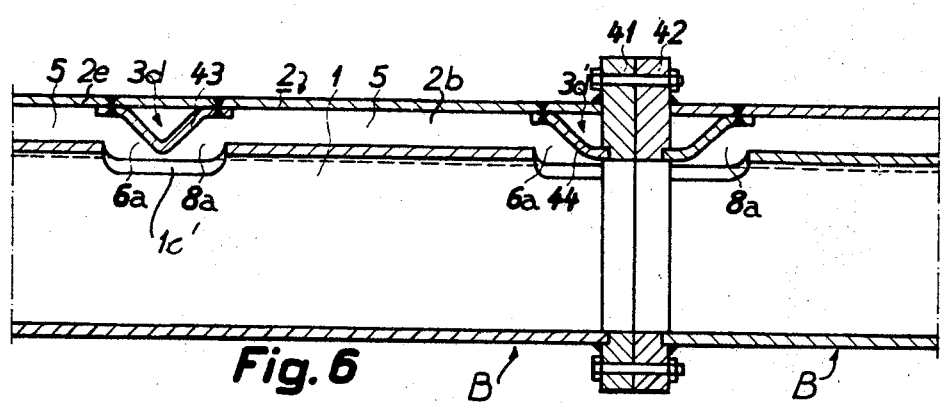
FIG. 6 is a longitudinal sectional view of a pipe section showing another arrangement of the general pipe section disposition illustrated in FIG. 1.

In the arrangement shown in FIG. 1, the web section 3 depends vertically downwardly and transversely across the passageway 2b through the branch conduit 2. In order to improve the flow characteristics of the material passing through the branch conduit, in FIG. 6 the configuration of the web section is changed. In FIG. 6, pipe sections B are shown connected by flanges 41, 42 located at the juxtaposed ends of the pipe sections. Intermediate the ends of the pipe section openings 1c' extend between the main conduit 1 and the branch conduit 2. The passageway 2b in the branch conduit is divided into a plurality of separate sub-passageways 5 by a web section 3d which also divides the opening 1c' between the main and branch conduits into a pair of apertures 6a, 8a for egress and ingress to the sub-passageways 5. At the intermediate openings in the pipe section, the web section 3d has a V-shaped configuration with a pair of legs 43 extending upwardly from the opening and attached to the inner surface of the wall member 2e forming the branch conduit. The inclined or sloping arrangement of the legs 43 of the web section 3d provide a preferred deflection of the flow of material between the main and branch conduits through the apertures 6a and 8a. Advantageously, the length of the pipe sections B are selected in such a manner that each length is an integral multiple of the distance between adjacent openings 1c'. Accordingly, in the arrangement shown in FIG. 6, an exit 6a from the branch to the main conduit is provided at one side of the joint formed by the connecting flanges 41, 42 and an inlet aperture 8a is arranged at the other side of the joint. Since the flanges 41, 42 extend transversely across the branch conduit, similar to the arrangement of the webs in FIGS. 2 to 4, to afford the proper deflection of material into or out of the branch conduits, a web section 3d' is provided with a sloping surface 44 secured at its lower edge to the flange and at its upper edge to the inner surface of the wall section 2a. As a result of the arrangement of the web sections 3d, 3d', shown in FIG. 6, the flow of short particles of material is improved as it passes between the main and branch conduits.

If, for some reason, the spacing of openings in a pipe section do not coincide with the flange spacing as shown in FIG. 6, then an arrangement as set forth in FIG. 7 might be used. In this arrangement, the flanges 41a, 42a connect adjoining pipe sections C. Since the flow passageway through the branch conduits 2 are not supplied with openings at the location of the flanges, a bypass construction is employed to pass the material from one branch conduit to the next around the flanges 41a, 42a. At the adjoining ends of the pipe sections C, C, a pipe section 51, 52 is secured to and extends upwardly from each of the branch conduits. A U-shaped pipe 53 is secured to each of the pipes 51, 52 by means of clamps 55 to provide a continuous passageway between the branch conduits around the flanges.

In the arrangement displayed in FIG. 6, the web section 3d is welded to the walls of the branch conduit, however, in FIG. 7, the web section 3e is bolt connected to the walls of the branch conduit. The web section 3e has a V-shaped configuration with a pair of legs 61, 62 extending upwardly from exit and entrance apertures 6b, 8b to the opposite inner surfaces of the branch conduit. As distinguished from the openings shown in FIGS. 1 and 6, a web 15 separates the apertures 6b, 8b in FIG. 7. The web section 3 rests on the web 15 and is clamped in tightly fitting engagement with the wall member 2f of the branch conduit by means of a bolt 64 and a nut 65 positioned on the outer surface of the branch conduit. By tightening the nut 65 on the bolt 64, the legs 61, 62 of the web section 3e are forced into engagement against the inner surface of the branch conduit.

This arrangement has the advantage of easy assembly and disassembly of the pipe line for purpose of control. Further, because of the bypass between adjacent branch conduits of the pipe sections C, there is no longer a need for the overall length of the pipe line to be an integral multiple of the lengths of the individual pipe sections.

In order to control the flow of the material through the pipe line, it is advantageous to have at least a portion of the pipe sections formed of transparent material. In FIG. 8, there is shown a pipe section arrangement which is particularly advantageous for use in establishing a gas impermeable connection for a transparent conduit in a pipe line. In this arrangement, the outer surface 12 of the main conduit 1 has a pair of longitudinally extending ribs 78, 79 extending along either side of the branch conduit wall section 72 disposed on top of the main conduit. The transparent wall section 72 has a configuration similar to the ones shown in FIGS. 2 and 5 with a pair of downwardly depending legs with edges 71 running along the outer surface 12 of the main conduit. Disposed between the wall section 72 and the ribs 78, 79 are sections of sealing material 76, 77. At the positions of the openings between the main conduit and the branch conduit, the web sections 73 are secured to the wall section 72. Bolts 74 are located at the position of the web section 73 secured to and extending downwardly from the outer surface of the wall section 72. By tightening nut 75 on the bolt 74, the edges 71 of the wall section 72 are clamped tightly against the sealing material 76, 77 which are confined by the ribs 78, 79 forming a gas-tight joint for the connection between the wall section 72 and the main conduit. This particular construction permits with the use of relatively simple means an effective gas-tight connection between the branch conduit and the main conduit.

In the embodiments shown thus far, the main conduit is formed by a tubular section providing a closed passageway and the branch conduit is formed by a multi-sided or curved wall section having an inverted trough-like configuration which combines with the outer surface of the main conduit to provide the branch conduit. However, in FIGS. 9 and 10, and arrangement is shown where a pair of closed tubular sections combine to provide the pipe line. The main conduit is formed by a pipe 91 and the branch conduit by a smaller pipe 92 arranged in parallel relationship and extending along the crown of the pipe 91. Openings 91a, 92a are provided through the respective main and branch conduits in registry with one another to afford flow therebetween. Disposed about the openings 91a, 92a is a sealing material 90 to effect a gas-tight closure at the location of the openings. At its opening 92a the pipe 92 is deformed to provide a V-shaped web section 93 which forms a barrier across the branch conduit at the opening and divides it into an exit aperture 6c and an entrance aperture 8c. In FIG. 10, it will be noted that the lower edge or apex of the web section 93 rests on the lower portion of the pipe 92.

The pipes 91, 92 are are secured together by a tensioning device which comprises a flexible band 96 extending around the outer surface of the pipe 91 and passing over the upper surface of the pipe 92. At each of its ends, the band has a U-shaped or hooked portion 96a holding a pin 97, 98. One of the pins 97 has a smooth bore and the other pin 98 has a threaded bore. A locking bolt 95 having a head 99 extends through the pin 97 and is threaded into the bore in pin 98. By threading the locking bolt 95 into the bolt or pin 98, the band is tightened about the pipes 91, 92 and the two pipes are forced together so that a gas-tight joint is obtained at the openings 91a, 92a, by means of the sealing material 90.

In this construction, the pipe 92, which is separated by web sections 93 into individual sub-passageways 5, provides a self-contained passageway separate from the pipe 91. There is no common wall between the branch conduit and the main conduit. Accordingly, this construction is particularly adaptable for temporary pipe lines. All that is required is to a clamp the suitably perforated pipes together to establish a pipe line with a main conduit and an intercommunicating branch conduit.

Thus far, in the arrangements illustrated in FIGS. 1 to 10, larger pipe sections have been disclosed for various material conveying situations. The pipe section shown in FIGS. 11 to 14, disclose a pipe section having a single exit and entrance between the main conduit and the branch conduit.

In FIG. 11, a pair of pipe sections 101 are arranged in longitudinal alignment. The pipe 101 has a flange 113 at one end and a flange 114 at its opposite end for connection to adjacent pipes. Interiorly, the pipe 101 is divided by a plate member 104 into a main conduit 1' and a branch conduit 2'. At each end of the pipe 101, the plate 104 has a web section 103 punched from it and extending upwardly into contact with the upper surface of the pipe 101. At one end of the pipe 101 the opening formed by the removal of the web section 103 provides an entrance opening 108 from the main conduit into the branch conduit, while at its opposite end, the punched out web section forms an exit opening 106.

As illustrated in FIG. 12, the plate 104 has a pair of downwardly depending sides 105 which are in contact with the inner surface of the pipe 101. At the lower ends of the sides 105 sealing ridges 110 guarantee the resilient securement of the plate 104 within the pipe 101 without need for any additional connecting means.

The webs 103 extend in an upwardly sloping direction from the plate 104 to the crown surface of the pipe 101 for deflecting the flow of material between the main conduit and the branch conduit. When two adjacent pipe sections 101 are secured together by clamping means 115, the exit opening 106 in one pipe section is located adjacent the entrance opening 108 in the adjacent pipe. In this way, once the individual pipe sections are secured together, a complete pipe line with main and branch conduits is developed.

As an alternative to the arrangement shown in FIG. 11, the pipe line 101a in FIG. 14 has the interior divided by plate 104a into a main conduit 1' and a branch conduit 2'. The sides of the plate 104A extend downwardly along the inner surface of the pipe 101a securing the plate in position. In pipe section 101A, the plate 104A is perforated at approximately its midpoint between the ends of the pipe to establish a pair of openings 106A, 108A between the branch conduit 2' and the main conduit 1'. At the opening, the plate 104A is punched out to provide a V-shaped web section 103A. The section 101A is provided with a pair of flanges 113A, 114A for connection to adjacent pipe sections.

The pipe sections disclosed in FIGS. 11 to 14 afford standard elements for the construction of pipe lines of any desired length. The plates 104, 104A divide a single closed passageway within the pipe 101, 101A into a main conduit and a branch conduit.

To provide a construction which can be adapted to various problems in the conveyance of solid materials another embodiment is shown in FIGS. 15 to 17, wherein the spacing between openings from the branch to the main conduit can be varied as required.

In FIG. 15, the main conduit 1" is formed by a closed tubular passageway 200. The branch conduit is an inverted trough-shaped wall section 210 positioned on top of the tubular section 200 and extending in parallel relationship with it. Situated in longitudinally aligned and spaced locations along the tubular member 200 are openings 206, 208. Between each pair of openings is a separator section 215 having a hole 216 therethrough. On the outer surface of the tubular section 200, and extending along the line of its openings 206, 208 is a sealing member 120. In accordance with the particular requirements of the material to be conveyed, openings 121 are provided through the sealing member 120 in registry with certain of the openings 206, 208 in the main conduit 1". As can be noted in FIG. 15, the openings 206, 208 which are not to be used are sealed by the member 120. Positioned at each of the locations of the aligned openings in the tubular member 200 and the sealing member 120 is a generally V-shaped web section 203 having the apex contacting the web 215 between the openings 206, 208 and diverging upwardly into contact with the upper surface of the wall section 210. The web section 203 is secured to the tubular section 200 by means of a rivet 204. Under certain conditions of material transport through the main and branch conduits, the distance from one pair of exit-entrance openings 206, 208 to the next is made smaller than or equal to the largest possible length of the particle of material which is being conveyed through the pipe line.

The wall section 210 whose edges 211 extend along and adjacent to the surface of the tubular section are in engagement with the sealing member 120. As shown in FIG. 17, the wall section 210 is forced into fluid-tight engagement with the tubular section by means of a U-bolt construction similar to that shown in FIG. 5. A U-bolt 225 encircles the tubular section 200 and has a pair of upwardly directed threaded ends 225a arranged to receive nuts 227. Disposed across the U-bolt 225 and fitted onto its threaded ends 225 is a plate member 226 which bears against the upper surface of the plate section 210. By tightening the nuts 227 on the threaded ends 225a of the U-bolt 225, the plate 226 forces the edges 211 of the wall section 210 into fluid tight engagement against the sealing member 120.

By employing the construction shown in FIGS. 15 to 17, many varied problems of material conveyance can be solved using a uniform set of elements which can provide different spacings for the openings communicating between the main and the branch conduits. In the arrangement shown in FIG. 15, if a different arrangement is required, the sealing member 120 can be removed and different openings provided. In addition, the position of the web sections 203 at the openings also can be adjusted as required.

Figure 18:
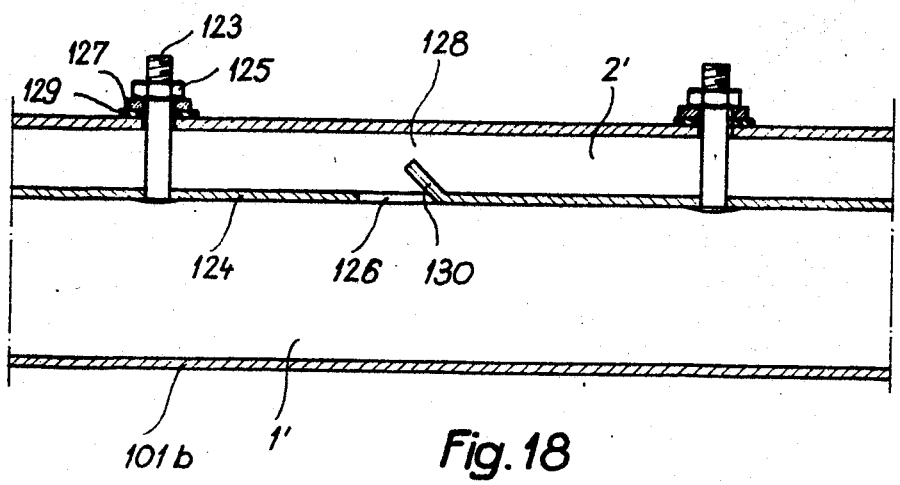
FIG. 18 is a longitudinal sectional view of another arrangement of the general pipe section construction illustrated in FIG. 11.

In FIG. 18, another arrangement is shown for securing the plate which divides a singular tubular member into a main conduit and a branch conduit. In pipe section 101b, a plate 124 divides its interior passageway into a main conduit 1', and a branch conduit 2'. The plate 124 is secured to the pipe section 101b by means of tensioning bolts 123 which are secured to the plate 124 and extend through the pipe 101b. On the exterior surface of the pipe 101b, sealing material 129 is disposed about the bolt and a washer 127 is superposed on the sealing material. A nut 125 is provided on the threaded end of the bolt 123, for tensioning the bolt and securing the plate 124 into position within the pipe 101b.

In the various embodiments illustrated previously, the web section disposed within the branch conduit has extended completely across the passageway of the conduit so that all flow is directed through the adjacent opening. In FIG. 18, the web 130 which is punched from the plate 124 slopes upwardly into the branch conduit 2', however, it is spaced from the opposite surface of the pipe 101b so that an exit opening 126 is provided between the branch and main conduits and an entrance opening 128 affords the continued flow through the branch conduit.

In a number of cases, the arrangement shown in FIG. 18 has proved advantageous since the conveying medium does not necessarily simultaneously flow through the main and branch conduits. Normally, the material is transported by the conveying air in the main conduit 1' and has no reason to flow through the branch conduit 2' which has a higher flow resistance. If, however, the flow of material is stopped because of a blockage occurring due to the nature of the material, the conveying fluid such as air, will exit from the main conduit 1' and enters the branch conduit 2' and then exits from the branch conduit at the point where the main conduit is not blocked.

The advantage of this arrangement resides particularly in the simple construction of the main and branch conduits as well as in the particularly advantageous disposition of the entrance and exit openings between the main and branch conduits.

Without deviating from the inventive concept, it is easily possible, on the basis of multiple embodiments illustrated and described, to modify the main and branch conduit construction to accommodate different pipe line profiles, different conduit profiles, different elements for dividing the branch conduit and different sealing means for assuring fluid-tight contact between the structures forming the branch and main conduits. It is particularly in the discretion of a person skilled in the art and within the scope of the invention to arrange the branch conduits for the formation of a plurality of conduits extending along the extent of pipe line.

While specific embodiments of the invention have been shown and described in detail to illustrate the application of the inventive principles, it will be understood that the invention may be embodied otherwise without departing from such principles.

What is claimed is:

1. A pipe section for use in material handling apparatus for continuously conveying solid bulk material in particle form in a pneumatic or hydraulic medium and comprising a longitudinally extending main conduit forming a main passageway for conveying solid material therethrough, a longitudinally extending branch conduit forming a main passageway with the axis of said branch passageway being straight and extending in continuous substantially parallel relationship with the axis of said main passageway, said main conduit and branch conduit having common openings communicating between the main passageway and the branch passageway and said openings being disposed in longitudinally spaced relationship and a web member located within said branch conduit at the location of each of the common openings and extending into and transversely across at least a portion of the branch passageway therethrough for directing the flow of material between said main conduit and branch conduit, said web member having at least a portion thereof located at the periphery of the branch passageway adjacent the periphery of the main passageway.

2. A pipe section, as set forth in claim 1, wherein said main conduit comprises a tubular member forming a longitudinally extending main passageway having at least one opening in its surface, said branch conduit formed by an open-sided wall section having a pair of longitudinally extending edges in contact with the exterior surface of said tubular member, the portion of said wall section between said edges spaced from the exterior surface of said tubular member and forming the branch passageway therebetween, the opening in said tubular member communicating between the main passageway in said main conduit and the branch passageway in said branch conduit.

3. A pipe section, as set forth in claim 2, wherein said wall section has a curved transverse cross section.

4. A pipe section, as set forth in claim 2, wherein said wall section has a transverse V-shaped section.

5. A pipe section, as set forth in claim 2, wherein said wall section has a transverse U-shaped cross section.

6. A pipe section, as set forth in claim 2, wherein said web member is formed by a plate positioned transversely across the passageway formed in said branch conduit, the edges of said plate attached to said wall section and substantially completely obstructing the passageway in said branch conduit, and said web member dividing the opening between said main and branch conduits into an inlet aperture and an outlet aperture between the respective passageways.

7. A pipe section, as set forth in claim 6, wherein the edge of said web member located adjacent the opening in said tubular member is positioned in longitudinal alignment with the surface of said tubular member.

8. A pipe section, as set forth in claim 6, wherein the edge of said web member located adjacent said tubular member extends in a straight line between the longitudinal edges of said wall section.

9. A pipe section, as set forth in claim 2, wherein the longitudinal edges of said wall section are integrally attached to said tubular member along its exterior surface.

10. A pipe section, as set forth in claim 2, wherein means are provided for mechanically securing the longitudinal edges of said wall section to the exterior surface of the said tubular member.

11. A pipe section, as set forth in claim 10, wherein said means comprise a sealing material being disposed between the longitudinal edges of said wall and the exterior surface of said tubular member forming a fluid-tight joint therebetween.

12. A pipe section, as set forth in claim 10, wherein said means comprise a pair of bearing ribs secured to the exterior surface of said tubular member and extend longitudinally therealong in parallel relationship with the edges of said wall section and spaced outwardly therefrom, a sealing material disposed between said bearing ribs on said tubular surface and said edges of said wall member, and a mechanical device for forcing the edges of said wall section into fluid-tight engagement with the sealing material disposed between said edges and said bearing ribs secured to said tubular member.

13. A pipe section, as set forth in claim 2, wherein said web member comprises a V-shaped section disposed within said branch conduit and having its apex positioned at the opening between said main and branch conduits, and its side surfaces sloping from its apex to the opposite inner surface of said wall section.

14. A pipe section, as set forth in claim 13, wherein said web member is integrally attached to said wall section.

15. A pipe section, as set forth in claim 13, comprising means for mechanically securing said web member to said wall section.

16. A pipe section, as set forth in claim 2, wherein a flange is mounted on the end of said tubular member, said flange forming an obstructing partition for the passageway in said branch conduit, an opening in said tubular member at said flange between said main conduit and said branch conduit, and a web plate secured to said flange closely adjacent the opening in said tubular member and extending in a sloping direction away from said flange to the inside surface of said wall section.

17. A pipe section, as set forth in claim 2, wherein a flange member is secured to the end of said tubular member for attaching it to another tubular member tubular means secured to said branch conduit for forming a bypass from the branch conduit in one pipe section to the branch conduit in another pipe section.

18. A pipe section, a set forth in claim 2, wherein at least a portion of said wall section is formed of a transparent material for permitting the viewing of the flow of material through said branch conduit.

19. A pipe section, as set forth in claim 1, wherein a longitudinally extending tubular member forms said main conduit and said branch conduit, a longitudinally extending divider plate is disposed within said tubular member and divides it into said main conduit and said branch conduit, the longitudinal edges of said divider being in contact with the inside surface of said tubular member.

20. A pipe section, as set forth in claim 19, wherein said divider plate comprises a partition section extending across said tubular member from one side to the other, and a pair of side members depending from said partition member at its opposite longitudinally extending edges in resilient contact with the juxtaposed surfaces of said tubular member.

21. A pipe section, as set forth in claim 19, wherein a bolt is secured to said divider plate and to said tubular member for securing said divider plate in position within said tubular member.

22. A pipe section, as set forth in claim 19, wherein openings are formed through said divider plate, and a web section is secured to said divider plate, and a web section is secured to said divider plate and extends therefrom into the passageway of the branch conduit forming a directive vane for the flow of material between said main conduit and said branch conduit.

23. A pipe section, as set forth in claim 22, wherein said web section is punched from said divider plate and extends into the passageway in said branch conduit, and is in contact at its edges spaced from said opening with the wall of said tubular member within said branch conduit passageway.

24. A pipe section, as set forth in claim 1, wherein said main conduit comprises a tubular member forming a longitudinally extending main passageway having at least one opening in its surface, said branch conduit formed by an opensided wall section having a pair of spaced longitudinally extending edges, the portion of said wall section between said edges being spaced from the exterior surface of said tubular member and forming the branch passageway therebetween, said main conduit having a plurality of aligned openings extending in the longitudinal direction and communicating between the main passageway in said main conduit and the branch conduit, a longitudinally extending sealing member disposed on and covering a portion of the exterior surface of said tubular member and extending along the line of said openings through said tubular member, said sealing member being arranged for uncovering at least one opening through said tubular member and the longitudinal edges of said wall section being in engagement with said sealing member.

25. A pipe section, as set forth in claim 19, wherein a web section is secured to said divider plate and extends into the passageway in said branch conduit being spaced from the surface of said tubular member therein whereby flow may be directed from the main conduit into the branch conduit or between said web section and the surface of said tubular member within said branch conduit for affording continuous flow therethrough.

References Cited

UNITED STATES PATENTS

| | | | |
|---|---|---|---|
| 2,067,078 | 1/1937 | Faber | 138—115 X |
| 2,488,615 | 11/1949 | Arnold | 138—38 |
| 3,229,722 | 1/1966 | Kritzer | 138—117 X |

FOREIGN PATENTS

| | | |
|---|---|---|
| 4,853 | 1880 | Great Britain. |
| 729,659 | 5/1955 | Great Britain. |
| 1,174,256 | 7/1964 | Germany. |

MERVIN STEIN, Primary Examiner

U.S. Cl. X.R.

138—115

UNITED STATES PATENT OFFICE
CERTIFICATE OF CORRECTION

Patent No. 3,524,478             Dated August 18, 1970

Inventor(s)     H. RAPP ET AL

It is certified that error appears in the above-identified patent and that said Letters Patent are hereby corrected as shown below:

Claim 1, column 9, line 17:

For "main" substitute -- branch --

Claim 22, column 10, lines 66/67, cancel

"and a web section is secured to said divider plate,"

Signed and sealed this 8th day of December 1970.

(SEAL)"
Attest:

EDWARD M. FLETCHER, JR.            WILLIAM E. SCHUYLER, JR.
Attesting Officer                   Commissioner of Patents